Patented Feb. 11, 1936

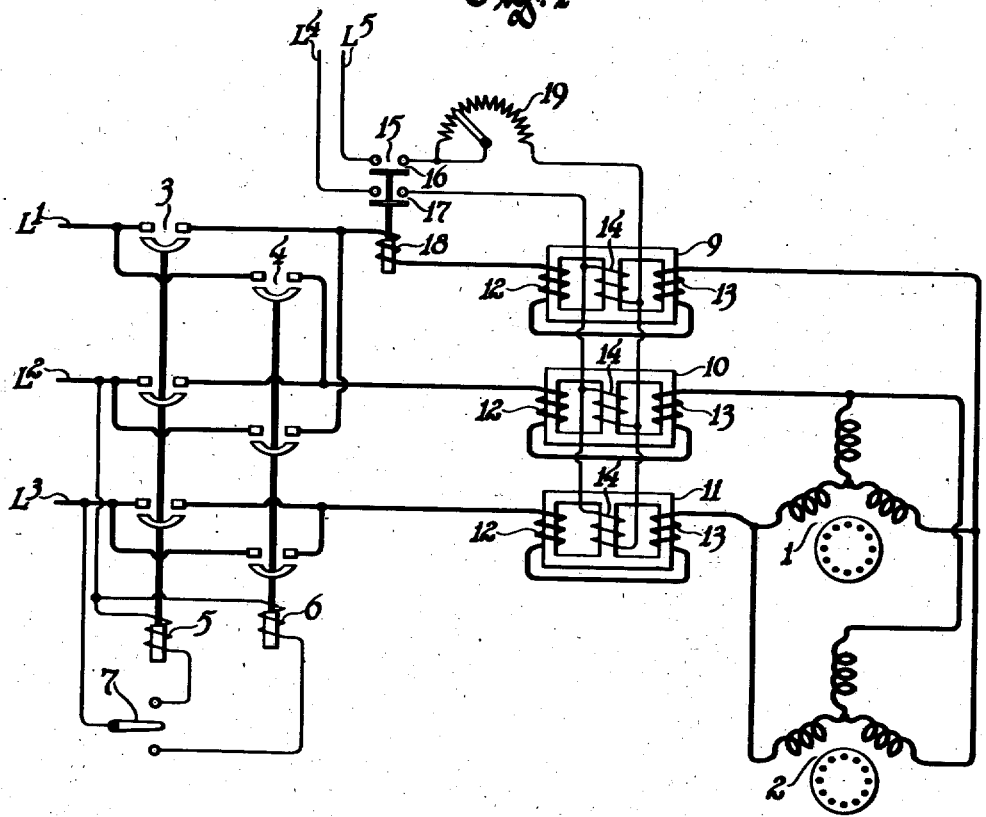

2,030,470

UNITED STATES PATENT OFFICE 2,030,470

MOTOR CONTROL

Frank J. Russell, Wauwatosa, Wis., assignor to Cutler-Hammer, Inc., Milwaukee, Wis., a corporation of Delaware Application April 14, 1933, Serial No. 666,096

9 Claims. (Cl. 172—289)

This invention relates to control of electric motors, and more particularly squirrel cage motors.

In practice it is desired to employ squirrel cage motors for driving the chains of feeder catcher tables of mills for rolling tin plates, but such motors cannot be so employed with success unless suitably controlled in acceleration and deceleration for accomplishment thereof while the motors make only a small number of revolutions and provision of satisfactory control has proven troublesome. Unless the motors are properly controlled the piled plates are apt to slip, and are apt to become damaged by slippage, whereas it has been found difficult, if not impossible, to obtain the desired control of the motors by use of the customary resistance for the motor primaries.

The present invention has among its objects to provide for control of such motors in a manner well adapting them to the aforementioned and other uses.

Another object is to provide a controller which may be readily adjusted to meet different operating conditions.

Another object is to provide a controller rendering unnecessary employment of moving parts essential to controllers of the resistance type.

Another object is to provide a controller having a time limit characteristic and yet not requiring a dash pot timer or other special timing device.

Another object is to provide a controller which as regards cost will be comparable with a controller of the resistance type.

Other objects and advantages of the invention will hereinafter appear.

The accompanying drawing illustrates one embodiment of the invention which will now be described.

In the drawing,

Figure 1 is a diagrammatic view of a pair of motors and control means therefor, and Fig. 2 is a copy of an oscillogram illustrative of the functioning of the controller.

Referring to Fig. 1, the same illustrates two squirrel cage motors 1 and 2 such as are used for the feeder catcher tables of tin plate mills in which service the motors as aforeindicated must be accelerated and reversed within very brief periods corresponding to a relatively small number of revolutions of the motors. The motors have their primary windings connected in parallel to be supplied from lines $L^1$, $L^2$, $L^3$ of a 3 phase supply source. The continuity of the primary circuits of motors 1 and 2 is controllable by triple pole reversing switches 3 and 4 of usual form which are provided with operating windings 5 and 6, respectively, and with a master switch 7 to energize said windings selectively. As will be understood, the means for controlling continuity of circuit and reversals of current may assume any desired form, and as will be understood, the means illustrated provides for plugging of the motors in the usual way.

Further considering the controller shown in Fig. 1, the same comprises three reactors 9, 10 and 11 of like construction, and of well known form, one for each phase of the motor circuit. Each reactor comprises a magnetic frame on which are mounted series connected coils 12 and 13 through which current for one phase of the motor circuit is supplied, and a control coil 14 to be supplied from a direct current source $L^4$, $L^5$. As will be understood, the coils 12 and 13 have a maximum reactance value when their respective coil 14 is deenergized. Also as will be understood, when the coils 14 are supplied with direct current they function subject to an inherent time element to decrease the reactance values of coils 12 and 13, such decrease in reactance value being gradual. The coils 14 which are connected in parallel have common control means comprising a relay 15 having two poles 16 and 17 connected respectively between coils 14 and line $L^4$, and between said coils and line $L^5$, said relay having an operating winding 18 series connected in one phase of the motor circuit. This series relay is designed and adjusted to respond when the motor current rises to a given value, and to release when the motor current recedes to a given lower value. Also the control means of coils 14 comprises a rheostat 19 connected between said coils and line $L^5$.

The series relay 15 is normally open and thus when the motors are started from rest by closure of either of the reversing switches the coils 14 are disconnected from lines $L^4$, $L^5$, whereby the motors at the instant of starting are subjected to the maximum reactance of coils 12 and 13. On the other hand, assuming appropriate design and adjustment of the series relay the initial inrush of current to the motors will cause said relay to respond to connect the coils 14 to the D. C. supply circuit, and said coils will thereupon act to gradually reduce the reactance value of coils 12 and 13 for smooth acceleration of the motors. The motors in accelerating will effect reduction of the current supplied thereto and again assuming appropriate design and adjustment of the series relay it will release to disconnect the coils 14 when the motors have accelerated to a given degree. Disconnection of the coils 14, of course, tends to increase the reactance but with the series relay properly designed and adjusted such increase may be delayed until the motors attain a speed reducing the motor current to such a value that the voltage drop across the reactor coils will be small and unobjectionable.

Thus the reactors will be restored to a condition affording maximum reactance value thereof shortly after starting of the motors and if thereafter the reversing switches are operated for plugging of the motors the reactors will function first to control deceleration, and then to control reacceleration of the motors. More specifically, when plugging is initiated the reactors will provide a maximum reactance whereas the increase in value of the current of the motor circuit incident to plugging will cause the series relay again to respond to reconnect the D. C. coils, thereby effecting gradual decrease in reactance for deceleration and reacceleration of the motors. After the motors are thus reversed and reaccelerated the series relay will again release to disconnect the coils 14, thereby again preparing the reactors to function either upon restarting the motors from rest or upon plugging of the motors.

As will be apparent, the reactors are adjustable by the rheostat 19 which may be located at the mill control stand and thus the rheostat affords means whereby the mill attendant watching movement of the plates may readily adjust the controller to meet different operating conditions and thereby minimize chance of slipping, etc.

Referring to the oscillogram Fig. 2, the same shows the variation in reactance value of the reactors, or in other words, the variation in voltage drop across the coils 12 and 13 which may be obtained by supplying the coil 14 with direct current. Also this oscillogram shows that the attainment of full energization of the direct current coils involves a time element and that the resulting decrease in reactance value of the coils 12 and 13 is gradual. Also it shows the recovery of full reactance value of coils 12 and 13 when the coil 14 is deenergized, and as will be apparent the recovery is sufficiently quick to insure effectiveness of the reactors even where the periods between reversals are short. As will be understood, the line representing current of the direct current coils is wavy because of lack of mechanical perfection of the reactor employed, and as will be understood the current may be assumed to be as depicted by the dotted line which has been added to the oscillogram.

While the two motors are illustrated as controlled by reactors common thereto it will be apparent that they might have separate circuits with separate sets of reactors, and that if desired such reactors might be designed to enable the direct current coils of all to be controlled by means common thereto. Also it will be apparent that the reactors illustrated might be provided with any of the various known means to modify their inherent time elements.

What I claim as new and desire to secure by Letters Patent is:

1. In combination, a squirrel cage motor, a reactor having coils traversed by the current supplied to the motor and a control coil to be supplied from a direct current source, means to complete the motor circuit for operation of the motor in either direction and for plugging the motor, and automatic control means for said control coil to excite the same following initial completion of the motor circuit, to decrease the excitation of said control coil thereafter, continuing such condition of said coil through an initial stage of plugging whereby the reactor will afford increased reactance for plugging, and to increase excitation of said control coil after initiation of plugging.

2. In combination, a squirrel cage motor, reactors having coils traversed by the current supplied to the motor and direct current coils for varying the reactance value of the former coils, and means responsive to the motor current and operative at a given relatively high value of the motor current to supply said direct current coils with current and thereafter operative at a given lower value of the motor current to decrease the excitation of said direct current coils and to maintain such decrease in excitation until the motor current again attains said given relatively high value.

3. In combination, a squirrel cage motor, reactors having coils traversed by the current supplied to the motor and having control coils to be supplied with direct current, means to control the continuity of the motor circuit and to effect reversals of the motor, and means responsive to the motor current to connect said direct current coils to their source of supply when the motor current attains a given value, and to disconnect said direct current coils from circuit when the motor current recedes to a given value, said reactors under the control of said last mentioned means affording a given reactance upon initial starting of the motor and also upon initial plugging of the motor, and a varying reactance for initial acceleration and for subsequent plugging and reacceleration.

4. A method of controlling a squirrel cage motor having in the primary circuit reactors provided with controlling coils to be supplied with direct current which consists in establishing starting connections for the motor, effecting acceleration of the motor through excitation of the controlling coils, decreasing the excitation of the controlling coils while the motor is running, establishing plugging connections while the excitation of the controlling coils is decreased, and again increasing the excitation of the controlling coils to control plugging and to effect reacceleration of the motor.

5. A method of control for squirrel cage motors having in circuit therewith reactors provided with control coils to be supplied with direct current which consists in establishing starting connections for the motor and providing for maximum reactance for initial starting by disconnection of the control coils, then exciting the control coils for acceleration of the motor and again disconnecting them from circuit, then establishing plugging connections for the motor while the control coils are disconnected and again exciting the control coils for controlling plugging and reacceleration of the motor.

6. In combination, a squirrel cage motor, reactors having coils traversed by the current supplied to said motor and direct current coils for varying the reactance value of said reactors, means responsive to the motor starting current to effect a given degree of excitation of the direct current coils, said means being thereafter operable at a given value of the motor current as the motor current decreases to a normal running value, to effect a given decrease in excitation of the direct current coils, restoring them to their initial condition, and means affording adjustment of the degree of excitation of the direct current coils effected by the former means.

7. In combination, a squirrel cage motor, reactors having coils traversed by the current supplied to said motor, and direct current coils for varying the reactance value of the former coils, and means controlling the supply of direct current to said direct current coils, said means comprising an electroresponsive relay responsive to the motor starting current to effect increase in excitation of said coils and releasable at a given value of the motor current as it recedes to a normal running value, to effect decrease in excitation of said direct current coils for restoration of the latter to the initial condition.

8. In combination, a squirrel cage motor, reactors having coils traversed by the current supplied to the motor, and direct current coils for varying the reactance value of the former coils, means controlling the supply of direct current to said direct current coils, said means comprising an electroresponsive relay responsive to the motor starting current to effect increase in excitation of said coils and releasable at a given value of the motor current as it recedes to a normal running value, to effect decrease in excitation of said direct current coils for restoration of the latter to the initial condition, and means affording adjustment of the degree of excitation of the direct current coils by the former means.

9. In combination, a squirrel cage motor, reactors having coils traversed by the current supplied to said motor and direct current coils for varying the reactance value of said reactors, and means responsive to the motor starting current to effect a given degree of excitation of the direct current coils, said means being thereafter operable at a given value of the motor current as the motor current decreases to a normal running value, to effect a given decrease in excitation of the direct current coils, restoring the latter to their initial condition.

FRANK J. RUSSELL.